US00RE44893E

(19) United States
(12) Reissued Patent
Raghavendran et al.

(10) Patent Number: US RE44,893 E
(45) Date of Reissued Patent: May 13, 2014

(54) FIBER REINFORCED THERMOPLASTIC SHEETS WITH SURFACE COVERINGS

(75) Inventors: Venkat Krishna Raghavendran, Greer, SC (US); Thomas Arnold Ebeling, Forest, VA (US)

(73) Assignee: Hanwha Azdel, Inc., Forest, VA (US)

(21) Appl. No.: 13/427,131

(22) Filed: Mar. 22, 2012

Related U.S. Patent Documents

Reissue of:
(64) Patent No.: 7,682,697
Issued: Mar. 23, 2010
Appl. No.: 11/441,709
Filed: May 26, 2006

U.S. Applications:
(63) Continuation-in-part of application No. 10/810,739, filed on Mar. 26, 2004, now Pat. No. 7,244,501.

(51) Int. Cl.
*B32B 27/36* (2006.01)
*B32B 27/38* (2006.01)

(52) U.S. Cl.
USPC ..... 428/412

(58) Field of Classification Search
USPC ..... 156/62.4, 62.8; 264/138, 255, 299, 308; 428/292.1, 319, 411.1
See application file for complete search history.

(56) References Cited

U.S. PATENT DOCUMENTS

| | | | |
|---|---|---|---|
| 1,707,008 | A | 5/1929 | Havemeyer |
| 2,815,979 | A | 12/1957 | Seymour |
| 2,976,577 | A | 3/1961 | Gould |
| 3,022,210 | A | 2/1962 | Phillips |
| 3,179,782 | A | 4/1965 | Matvay |
| 3,437,550 | A | 4/1969 | Paul |
| 3,484,223 | A | 12/1969 | Vanderbilt |
| 3,627,603 | A | 12/1971 | Greig |
| 3,639,157 | A | 2/1972 | Winckler |
| 3,639,424 | A | 2/1972 | Gray |
| 3,684,645 | A | 8/1972 | Temple |
| 3,713,962 | A | 1/1973 | Ackley |
| 3,716,449 | A | 2/1973 | Gatward |
| 3,779,592 | A | 12/1973 | Goize |
| 3,809,420 | A | 5/1974 | Weller |
| 3,849,241 | A | 11/1974 | Butin |
| 3,850,723 | A | 11/1974 | Ackley |
| 3,853,808 | A | 12/1974 | Sishikawa |
| 3,857,813 | A | 12/1974 | Stain |
| 3,865,661 | A | 2/1975 | Hata |
| 3,871,952 | A | 3/1975 | Robertson |
| 3,883,333 | A | 5/1975 | Ackley |
| 4,044,188 | A | 8/1977 | Segal |
| 4,052,241 | A | 10/1977 | Walter |
| 4,098,943 | A | 7/1978 | Degginger |
| 4,172,293 | A | 10/1979 | Vistins |
| 4,178,411 | A | 12/1979 | Cogswell |
| 4,201,823 | A | 5/1980 | Russell |
| 4,208,069 | A | 6/1980 | Huber |
| 4,211,590 | A | 7/1980 | Steward |
| 4,235,952 | A | 11/1980 | Holmes |
| 4,248,935 | A | 2/1981 | Temple |
| 4,263,082 | A | 4/1981 | Temple |
| 4,277,531 | A | 7/1981 | Picone |
| 4,278,720 | A | 7/1981 | Shannon |
| 4,285,767 | A | 8/1981 | Page |
| 4,335,176 | A | 6/1982 | Baumann |
| 4,341,877 | A | 7/1982 | Das |
| 4,358,501 | A | 11/1982 | Temple |
| 4,366,204 | A | 12/1982 | Briggs |
| 4,369,234 | A | 1/1983 | Baumann |
| 4,379,801 | A | 4/1983 | Weaver |
| 4,379,802 | A | 4/1983 | Weaver |
| 4,390,384 | A | 6/1983 | Turner |
| 4,412,854 | A | 11/1983 | Layden |
| 4,413,085 | A | 11/1983 | Temple |
| 4,423,000 | A | 12/1983 | Teraoka |
| 4,457,547 | A | 7/1984 | Sekiyama |
| 4,464,432 | A | 8/1984 | Dost |
| 4,469,543 | A | 9/1984 | Segal |
| 4,476,183 | A | 10/1984 | Holtrop |
| 4,482,180 | A | 11/1984 | Huber |
| 4,495,238 | A | 1/1985 | Adiletta |
| 4,508,499 | A | 4/1985 | Spengler |
| 4,519,766 | A | 5/1985 | Spengler |
| 4,529,641 | A | 7/1985 | Holtrop |
| 4,543,288 | A | 9/1985 | Radvan |

(Continued)

FOREIGN PATENT DOCUMENTS

| | | |
|---|---|---|
| AU | 661949 | 8/1993 |
| CA | 842919 | 5/1970 |

(Continued)

OTHER PUBLICATIONS

U.S. Appl. No. 11/437,997, filed May 19, 2006.
U.S. Appl. No. 13/416,617, filed Mar. 9, 2013.
U.S. Appl. No. 11/893,613, filed Oct. 22, 2007.
High Performance SuperLite Sheet, Disclosed Anonymously, IP.com, Aug. 2, 2002, 8 pgs.
Azdel Superlite Sheet—Technical Guide Part 1, Disclosed Anonymously, IP.com, Aug. 5, 2002, 21 pgs.
Azdel Superlite Sheet—Commercial Guide Part 1, Disclosed Anonymously, IP.com, Aug. 5, 2002, 8 pgs.
Azdel Superlite Sheet—Processing Guides, Disclosed Anonymously, IP.com, Aug. 6, 2002, 3 pgs.
Azdel Superlite Sheet—Technical Guide Part 2, Disclosed Anomymously, IP.com, Aug. 5, 2002, 32 pgs.
European Search Report; Aug. 13, 2008; 13 pages.

(Continued)

*Primary Examiner* — Terressa Boykin
(74) *Attorney, Agent, or Firm* — Rhodes IP PLC; Christopher R Rhodes

(57) ABSTRACT

A composite sheet material in one embodiment includes a porous core layer. The porous core layer includes a thermoplastic polymer, about 20 weight percent to about 80 weight percent of reinforcing fibers based on a total weight of the porous core layer, and an effective amount of a flame retardant agent.

43 Claims, 2 Drawing Sheets

(56) References Cited

U.S. PATENT DOCUMENTS 4,579,774 A 4/1986 Kuwazuru
4,586,739 A 5/1986 Loren
4,587,278 A 5/1986 Dotzauer
4,612,238 A 9/1986 Della Vecchia
4,615,717 A 10/1986 Neubauer
4,616,866 A 10/1986 Loren
4,634,483 A 1/1987 Spengler
4,635,984 A 1/1987 Loren
4,637,951 A 1/1987 Gill
4,663,369 A 5/1987 Kawai
4,670,331 A 6/1987 Radvan
4,670,343 A 6/1987 Makino
4,671,550 A 6/1987 Molnar
4,681,798 A 7/1987 Gill
4,692,375 A 9/1987 Neubauer
4,694,031 A 9/1987 Morita
4,704,423 A 11/1987 Iwanami
4,713,283 A 12/1987 Cogswell
4,714,650 A 12/1987 Obayashi
4,717,143 A 1/1988 Spengler
4,734,321 A 3/1988 Radvan
4,741,945 A 5/1988 Brant
4,749,613 A 6/1988 Yamada
4,755,575 A 7/1988 Domeier
4,762,352 A 8/1988 Enomoto
4,762,643 A 8/1988 Bohrn
4,762,750 A 8/1988 Girgis
4,767,321 A 8/1988 Chilva
4,775,725 A 10/1988 Depasquale
4,778,722 A 10/1988 Yamamura
4,793,802 A 12/1988 Chilva
4,802,843 A 2/1989 Chilva
4,804,577 A 2/1989 Hazelton
4,828,910 A 5/1989 Haussling
4,840,832 A 6/1989 Weinle
4,851,167 A 7/1989 Marc
4,882,229 A 11/1989 Hwo
4,892,780 A 1/1990 Cochran
4,913,774 A 4/1990 Goguelin
4,923,547 A 5/1990 Yamaji
4,924,224 A 5/1990 Suniszek
4,925,615 A 5/1990 Willis
4,940,629 A 7/1990 Weber
4,943,607 A 7/1990 Tanisake
4,944,843 A 7/1990 Wallace
4,950,532 A 8/1990 Das
4,951,986 A 8/1990 Hanafusa
4,952,448 A 8/1990 Bullock
4,963,603 A 10/1990 Felegi
4,978,489 A 12/1990 Radvan
4,983,247 A 1/1991 Kim
5,002,830 A 3/1991 Gillis
5,009,747 A 4/1991 Viazmensky
5,030,682 A 7/1991 Nomura
5,043,368 A 8/1991 Minnick
5,092,952 A 3/1992 Minnick
5,093,171 A 3/1992 Sheahan
5,098,781 A 3/1992 Minnick
5,115,077 A 5/1992 Matsuo
5,122,398 A 6/1992 Seiler
5,137,975 A 8/1992 Kelusky
5,147,345 A 9/1992 Young
5,151,320 A 9/1992 Homonoff
5,165,990 A 11/1992 Nakano
5,175,198 A 12/1992 Minnick
5,180,628 A 1/1993 Haardt
5,186,777 A 2/1993 Perenon
5,188,778 A 2/1993 Jeffs
5,219,913 A 6/1993 Tomatsu
5,231,126 A 7/1993 Shi et al.
5,246,538 A 9/1993 Johnson
5,262,491 A 11/1993 Jain
5,267,827 A 12/1993 Provan
5,269,574 A 12/1993 Bhutani
5,288,555 A 2/1994 Exxon
5,300,360 A 4/1994 Kocsis
5,306,739 A 4/1994 Lucey
5,316,834 A 5/1994 Matsuda
5,322,724 A 6/1994 Levens
5,338,059 A 8/1994 Inoue
5,342,463 A 8/1994 Addeo
5,344,866 A 9/1994 Hall
5,348,798 A 9/1994 Berghuis
5,354,829 A 10/1994 Swisher
5,376,701 A 12/1994 Chow
5,387,382 A 2/1995 Fottinger
5,403,654 A 4/1995 Muto
5,413,661 A 5/1995 Spengler
5,437,919 A 8/1995 Welich
5,464,585 A 11/1995 Fitzgibbon
5,470,658 A 11/1995 Gasca
5,484,653 A 1/1996 Kennedy
5,486,256 A 1/1996 Romesberg
5,502,088 A 3/1996 Hododi
5,503,903 A 4/1996 Bainbridge
5,529,742 A 6/1996 Strapazzini
5,536,556 A 7/1996 Juriga
5,540,986 A 7/1996 Kimura
5,549,776 A 8/1996 Juriga
5,565,259 A 10/1996 Juriga
5,576,080 A 11/1996 Sugimoto
5,582,906 A 12/1996 Romesberg
5,591,289 A 1/1997 Souders
5,614,285 A 3/1997 Gardill
5,627,226 A 5/1997 Lustiger
5,635,129 A 6/1997 Breezer
5,639,324 A 6/1997 Biggs
5,641,554 A 6/1997 Koizumi
5,643,989 A 7/1997 Van de Grampel
5,685,560 A 11/1997 Sugiyama
5,709,925 A 1/1998 Spengler
5,718,791 A 2/1998 Spengler
5,775,726 A 7/1998 Timothy
5,780,519 A 7/1998 Imoto
5,795,015 A 8/1998 Corpe
5,800,749 A 9/1998 Lewit
5,800,846 A 9/1998 Hart
5,804,511 A 9/1998 Kelman
5,817,408 A 10/1998 Orimo
5,839,752 A 11/1998 Yamasaki
5,840,812 A 11/1998 Schultze
5,845,929 A 12/1998 Schlett
5,853,628 A 12/1998 Varona
5,854,149 A 12/1998 Nagayama
5,866,051 A 2/1999 Lin
5,879,608 A 3/1999 Lammeck
5,883,021 A 3/1999 Beer
5,885,691 A 3/1999 Breezer
5,888,435 A 3/1999 Mueller
5,908,524 A 6/1999 Masui
5,910,458 A 6/1999 Beer
5,914,163 A 6/1999 Browne
5,922,626 A 7/1999 Pelzer
5,942,321 A 8/1999 Romesberg
5,952,089 A 9/1999 Namura
5,972,444 A 10/1999 Patel
5,976,451 A 11/1999 Skaja
5,979,931 A 11/1999 Totani
5,981,046 A 11/1999 Masui
5,985,429 A 11/1999 Plummer
6,007,898 A 12/1999 Kim
6,018,927 A 2/2000 Major
6,042,140 A 3/2000 Blazaitis
6,042,141 A 3/2000 Welch
6,042,765 A 3/2000 Sugahara
6,062,635 A 5/2000 Learman
6,099,055 A 8/2000 Hirota
6,120,090 A 9/2000 Van Ert
6,146,578 A 11/2000 Van Ert
6,150,287 A 11/2000 Boyd
6,203,304 B1 3/2001 Lopez Tonazzi
6,214,456 B1 4/2001 Boyd
6,238,518 B1 5/2001 Rokman
6,286,879 B1 9/2001 Haque

(56) References Cited

U.S. PATENT DOCUMENTS

| | | | |
|---|---|---|---|
| 6,287,678 | B1 | 9/2001 | Spengler |
| 6,293,045 | B1 | 9/2001 | Morgan |
| 6,322,658 | B1 | 11/2001 | Byma |
| 6,365,533 | B1 | 4/2002 | Horner |
| 6,368,702 | B1 | 4/2002 | Erickson |
| 6,369,157 | B1 | 4/2002 | Winckler |
| 6,420,047 | B2 | 7/2002 | Winckler |
| 6,423,933 | B2 | 7/2002 | Nicholas |
| 6,436,854 | B1 | 8/2002 | North |
| 6,503,372 | B1 | 1/2003 | Rokman |
| 6,565,712 | B2 | 5/2003 | Lindenfelser |
| 6,572,723 | B1 | 6/2003 | Tilton |
| 6,596,389 | B1 | 7/2003 | Hallett |
| 6,610,904 | B1 | 8/2003 | Thomas |
| 6,631,785 | B2 | 10/2003 | Khambete |
| 6,639,009 | B2 | 10/2003 | Winckler |
| 6,649,248 | B1 | 11/2003 | Schneider |
| 6,652,021 | B1 | 11/2003 | Dykman |
| 6,696,164 | B2 | 2/2004 | Clifford |
| 6,702,914 | B2 | 3/2004 | North |
| 6,762,138 | B2 | 7/2004 | Ferreira |
| 6,774,068 | B2 | 8/2004 | Sung-Ho |
| 6,808,576 | B2 | 10/2004 | Shimizu |
| 6,815,053 | B2 | 11/2004 | Inoue |
| 6,841,028 | B2 | 1/2005 | Tsukada |
| 6,994,914 | B2 | 2/2006 | Winckler |
| 7,047,668 | B2 | 5/2006 | Burris |
| 7,060,217 | B2 | 6/2006 | Dunton |
| 7,157,034 | B2 | 1/2007 | Bristow |
| 7,236,348 | B2 | 6/2007 | Asano |
| 7,244,501 | B2 | 7/2007 | Raghavendran |
| 7,255,391 | B2 | 8/2007 | Bristow |
| 7,318,498 | B2 | 1/2008 | Woodman |
| 7,329,457 | B2 | 2/2008 | Renard |
| 7,378,143 | B2 | 5/2008 | Schneider |
| 7,431,980 | B2 | 10/2008 | Woodman |
| 7,435,469 | B2 | 10/2008 | Maupetit |
| 7,482,048 | B2 | 1/2009 | Boutghrit |
| 7,629,278 | B2 | 12/2009 | Sabbagh |
| 7,682,697 | B2 | 3/2010 | Raghavendran |
| 7,695,815 | B2 | 4/2010 | Agarwal |
| 7,759,267 | B2 | 7/2010 | Conover |
| 7,845,265 | B1 | 12/2010 | Park |
| 7,922,854 | B2 | 4/2011 | Sabbagh |
| 7,972,685 | B2 | 7/2011 | Raghavendran |
| 8,021,746 | B2 | 9/2011 | Chen |
| 2001/0036788 | A1 | 11/2001 | Sandoe |
| 2001/0037854 | A1 | 11/2001 | Byma |
| 2002/0009936 | A1 | 1/2002 | North |
| 2002/0017805 | A1 | 2/2002 | Carroll |
| 2003/0008592 | A1 | 1/2003 | Block |
| 2003/0134101 | A1 | 7/2003 | Kikuchi |
| 2003/0138594 | A1 | 7/2003 | Lobovsky |
| 2003/0164218 | A1 | 9/2003 | Brahm |
| 2004/0002274 | A1 | 1/2004 | Tilton |
| 2004/0081797 | A1 | 4/2004 | Simmons |
| 2004/0112501 | A1 | 6/2004 | Dittmar |
| 2004/0216949 | A1 | 11/2004 | Tompson |
| 2004/0231915 | A1 | 11/2004 | Thompson |
| 2004/0235377 | A1 | 11/2004 | Byma |
| 2004/0254299 | A1 | 12/2004 | Lee |
| 2005/0032452 | A1 | 2/2005 | Helwig |
| 2005/0095415 | A1 | 5/2005 | Raghavendran |
| 2005/0153120 | A1 | 7/2005 | Birrell |
| 2005/0215698 | A1 | 9/2005 | Raghavendran |
| 2005/0217932 | A1 | 10/2005 | Woodman |
| 2006/0099393 | A1 | 5/2006 | Woodman |
| 2006/0182947 | A1 | 8/2006 | Jerri |
| 2006/0240242 | A1 | 10/2006 | Raghavendran |
| 2006/0244170 | A1 | 11/2006 | Brentup |
| 2007/0008869 | A1 | 1/2007 | Tsukamoto |
| 2007/0196637 | A1 | 8/2007 | Good |
| 2007/0238378 | A1 | 10/2007 | Conover |
| 2007/0269644 | A1 | 11/2007 | Harper |
| 2007/0269645 | A1* | 11/2007 | Raghavendran et al. .. 428/292.1 |
| 2007/0269654 | A1 | 11/2007 | Raghavendran |
| 2008/0001429 | A1 | 1/2008 | Willis |
| 2008/0008869 | A1 | 1/2008 | Good |
| 2008/0032094 | A1 | 2/2008 | Raghavendran |
| 2008/0070019 | A1 | 3/2008 | Good |
| 2008/0233342 | A1 | 9/2008 | Birrell |
| 2009/0011210 | A1 | 1/2009 | Gao |
| 2009/0053458 | A1 | 2/2009 | Birrell |
| 2009/0155522 | A1 | 6/2009 | Raghavendran |
| 2010/0021718 | A1 | 1/2010 | Vos |

FOREIGN PATENT DOCUMENTS

| | | | |
|---|---|---|---|
| CA | 938391 | | 12/1973 |
| CA | 1266540 | | 3/1990 |
| CA | 2054975 | | 11/1991 |
| CA | 2129453 | | 8/1993 |
| CA | 1335740 | | 5/1995 |
| DE | 1188279 | | 3/1965 |
| DE | 2231637 | | 2/1973 |
| DE | 2650096 | | 10/1976 |
| DE | 2527781 | | 12/1976 |
| DE | 3125987 | | 1/1983 |
| DE | 9214896 | | 12/1992 |
| DE | 69207432 | | 5/1996 |
| DE | 19520477 | | 12/1996 |
| DE | 20102194 | | 5/2001 |
| DE | 20106096 | | 6/2001 |
| DE | 10160442 | | 8/2002 |
| DE | 20106096 | U1 | 6/2006 |
| EP | 0001176 | | 3/1979 |
| EP | 0056703 | | 7/1982 |
| EP | 011104555 | | 4/1984 |
| EP | 0148760 | A2 | 7/1985 |
| EP | 0148763 | | 7/1985 |
| EP | 0150931 | | 8/1985 |
| EP | 0177961 | | 4/1986 |
| EP | 0255316 | | 2/1988 |
| EP | 0278409 | | 8/1988 |
| EP | 0312414 | | 4/1989 |
| EP | 0381857 | | 8/1990 |
| EP | 0404303 | | 12/1990 |
| EP | 0410678 | | 1/1991 |
| EP | 9100021 | | 7/1991 |
| EP | 0450638 | | 10/1991 |
| EP | 502141 | | 9/1992 |
| EP | 0502414 | | 9/1992 |
| EP | 0625104 | | 11/1994 |
| EP | 0625544 | | 11/1994 |
| EP | 0631862 | | 1/1995 |
| EP | 0635462 | | 1/1995 |
| EP | 0319589 | | 2/1995 |
| EP | 0651003 | | 5/1995 |
| EP | 0753402 | | 7/1995 |
| EP | 0671259 | | 9/1995 |
| EP | 0671259 | A1 | 9/1995 |
| EP | 0729829 | | 8/1996 |
| EP | 0758577 | | 2/1997 |
| EP | 0794215 | | 9/1997 |
| EP | 0808944 | | 11/1997 |
| EP | 0808944 | A2 | 11/1997 |
| EP | 0858481 | | 8/1998 |
| EP | 0945253 | | 9/1999 |
| EP | 1031467 | | 8/2000 |
| EP | 1211138 | | 6/2002 |
| EP | 1211138 | A1 | 6/2002 |
| EP | 1373375 | | 1/2004 |
| EP | 1812637 | | 5/2006 |
| EP | 1737650 | | 1/2007 |
| EP | 1844927 | | 10/2007 |
| EP | 1857261 | | 11/2007 |
| FR | 0625104 | | 11/1994 |
| GB | 1550358 | | 8/1979 |
| GB | 2077311 | | 12/1981 |
| JP | 62017048 | | 1/1987 |
| JP | 62157782 | | 6/1987 |
| JP | 62195030 | | 8/1987 |
| JP | 63230542 | | 9/1988 |
| JP | 1083087 | | 3/1989 |

(56) References Cited

FOREIGN PATENT DOCUMENTS

| | | | |
|---|---|---|---|
| JP | 1083088 | | 3/1989 |
| JP | 2138349 | | 5/1990 |
| JP | 1016660 | | 1/1998 |
| JP | 11342552 | | 12/1999 |
| WO | 9207983 | | 5/1992 |
| WO | 9315933 | | 8/1993 |
| WO | 9400418 | | 1/1994 |
| WO | 9415884 | | 7/1994 |
| WO | 9427840 | | 12/1994 |
| WO | 03035435 | | 1/1995 |
| WO | 9612849 | | 5/1996 |
| WO | 9716846 | | 9/1997 |
| WO | 9831626 | | 7/1998 |
| WO | 9834778 | | 8/1998 |
| WO | 9948683 | | 9/1999 |
| WO | 0208316 | | 1/2002 |
| WO | 0208316 | A1 | 1/2002 |
| WO | 02077076 | | 10/2002 |
| WO | 02081802 | | 10/2002 |
| WO | 02081802 | A1 | 10/2002 |
| WO | 03002330 | | 1/2003 |
| WO | 03086725 | | 10/2003 |
| WO | 2004004303 | | 8/2004 |
| WO | 2005070664 | | 8/2005 |
| WO | 2005097879 | | 10/2005 |
| WO | 2005100708 | | 10/2005 |
| WO | 2006008529 | | 1/2006 |
| WO | 2006052967 | | 5/2006 |
| WO | 2006089025 | | 8/2006 |

* cited by examiner

FIBER REINFORCED THERMOPLASTIC SHEETS WITH SURFACE COVERINGS

Matter enclosed in heavy brackets [ ] appears in the original patent but forms no part of this reissue specification; matter printed in italics indicates the additions made by reissue.

CROSS REFERENCE TO RELATED APPLICATIONS

This application is a Continuation-In-Part application of U.S. patent application Ser. No. 10/810,739, filed Mar. 26, 2004 now U.S. Pat. No. 7,244,501, which is hereby incorporated by reference in its entirety.

BACKGROUND OF THE INVENTION

This invention relates generally to porous fiber-reinforced thermoplastic polymer composite sheets, and more particularly to porous fiber-reinforced thermoplastic polymer composite sheets having flame retardants, smoke suppressants, and/or synergistic compounds along with surface coverings providing for at least one of reduced flame spread, reduced smoke density, reduced heat release, and reduced gas emissions.

Porous fiber-reinforced thermoplastic composite sheets have been described in U.S. Pat. Nos. 4,978,489 and 4,670,331 and are used in numerous and varied applications in the product manufacturing industry because of the ease molding the fiber reinforced thermoplastic sheets into articles. For example, known techniques such as thermo-stamping, compression molding, and thermoforming have been used to successfully form articles from fiber reinforced thermoplastic sheets.

Because of the varied applications, fiber-reinforced thermoplastic sheets are subjected to various performance tests. For example flame spread, smoke density, and gaseous emissions characteristics of the fiber-reinforced thermoplastic sheets are important when the formed articles are used in environments that might be subjected to a flame event, such as a fire. Because of safety concerns, there is a need to improve the flame, smoke and toxicity performance of fiber reinforced thermoplastic sheet products.

BRIEF DESCRIPTION OF THE INVENTION

In one aspect, a composite sheet material is provided that includes a porous core layer. The porous core layer includes a thermoplastic polymer, about 20 weight percent to about 80 weight percent of reinforcing fibers based on a total weight of the porous core layer, and an effective amount of a flame retardant agent.

In another aspect, a method of manufacturing a porous fiber-reinforced thermoplastic sheet is provided. The method includes providing a porous fiber-reinforced thermoplastic sheet having at least one porous core layer including a thermoplastic material, from about 20 weight percent to about 80 weight percent of reinforcing fibers, and an effective amount of a flame retardant agent. The method also includes laminating at least one skin to a surface of the porous fiber-reinforced thermoplastic sheet. Each skin includes at least one of a thermoplastic film, an elastomeric film, a metal foil, a thermosetting coating, an inorganic coating, a fiber based scrim, a non-woven fabric, and a woven fabric, the skin having a limiting oxygen index greater than about 22, as measured per ISO 4589, to enhance at least one of the flame, smoke, heat release and gaseous emissions characteristics of the porous fiber-reinforced thermoplastic sheet.

DETAILED DESCRIPTION OF THE INVENTION

Multi-layered porous fiber-reinforced thermoplastic composite sheets having characteristics of reduced flame spread, reduced smoke density, reduced heat release, and reduced gas emissions are described below in detail. In an exemplary embodiment, the multi-layered porous fiber-reinforced thermoplastic sheets include one or more porous core layers that are formed from one or more thermoplastic materials, about 20 weight percent to about 80 weight percent of fibers dispersed in the thermoplastic material, and an effective amount of a halogen fire retardant agent. At least one surface of the core layer is covered by a skin laminated to the core layer under heat and/or pressure with or without the use of an adhesive or a tie layer. The skin materials are chosen, at least in part, to impart the desired reduction in flame spread, heat release, smoke density, and gaseous emissions of the composite sheet when exposed to a fire event. Also, handling, moldability and end use performance can be improved by laminating two or more porous core layers together having different thermoplastic materials and/or different fibers. Further, skins can be laminated between core layers to affect performance characteristics. Additionally, moldability and formability can be improved by laminating at least one skin to a surface of the core layer where the skin is at least one of a fiber-based scrim, a non-woven fabric and a woven fabric.

Figure 1:
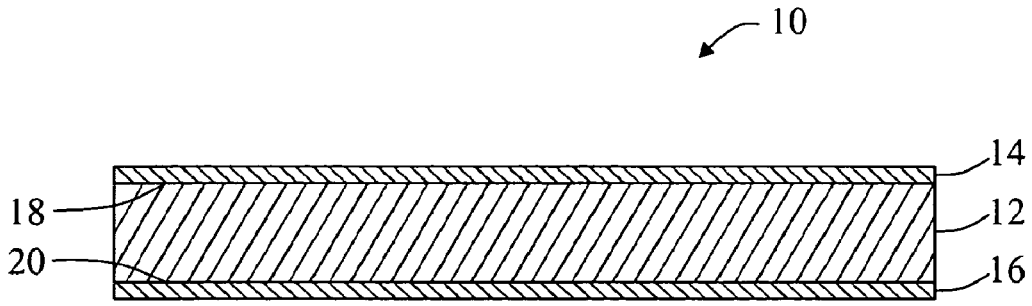
FIG. 1 is cross sectional illustration of an exemplary fiber reinforced thermoplastic sheet in accordance with an embodiment of the present invention.

Referring to the drawings, FIG. 1 is a cross sectional illustration of an exemplary fiber reinforced thermoplastic composite sheet 10 that includes one porous core layer 12 and skins 14 and 16 laminated to outer surfaces 18 and 20 of core layer 12. In one embodiment, composite sheet 10 has a thickness of about 0.5 millimeters (mm) to about 50 mm and in another embodiment, a thickness of about 0.5 mm to about 25 mm. Also, skins 14 and 16 each have a thickness in one embodiment of about 25 micrometers to about 5 mm, and in another embodiment from about 25 micrometers to about 2.5 mm.

Core layer 12 is formed from a web made up of open cell structures formed by random crossing over of reinforcing fibers held together, at least in part, by one or more thermoplastic resins, where the void content of porous core layer 12 ranges in general between about 5% and about 95% and in particular between about 30% and about 80% of the total volume of core layer 12. In an another embodiment, porous core layer 12 is made up of open cell structures formed by random crossing over of reinforcing fibers held together, at least in part, by one or more thermoplastic resins, where about 40% to about 100% of the cell structure are open and allow the flow of air and gases through. Core layer 12 has a density in one embodiment of about 0.2 gm/cc to about 1.8 gm/cc and in another embodiment about 0.3 gm/cc to about 1.0 gm/cc.

Core layer 12 is formed using known manufacturing process, for example, a wet laid process, an air laid process, a dry blend process, a carding and needle process, and other known process that are employed for making non-woven products. Combinations of such manufacturing processes are also useful. Core layer 12 includes about 20% to about 80% by weight fibers having a high tensile modulus of elasticity and an average length of between about 7 and about 200 mm, and about 20% to about 80% by weight of a wholly or substantially unconsolidated fibrous or particulate thermoplastic materials, where the weight percentages are based on the total weight of core layer 12 In another embodiment, core layer includes about 35% to about 55% by weight fibers. The web is heated above the glass transition temperature of the thermoplastic resins on core layer 12 to substantially soften the plastic materials and is passed through one or more consolidation devices, for example nip rollers, calendaring rolls, double belt laminators, indexing presses, multiple daylight presses, autoclaves, and other such devices used for lamination and consolidation of sheets and fabrics so that the plastic material can flow and wet out the fibers. The gap between the consolidating elements in the consolidation devices are set to a dimension less than that of the unconsolidated web and greater than that of the web if it were to be fully consolidated, thus allowing the web to expand and remain substantially permeable after passing through the rollers. In one embodiment, the gap is set to a dimension about 5% to about 10% greater than that of the web if it were to be fully consolidated. A fully consolidated web means a web that is fully compressed and substantially void free. A fully consolidated web would have less than 5% void content and have negligible open cell structure.

A high tensile modulus of elasticity means a tensile modulus of elasticity substantially higher than that of a consolidated sheet which could be formed from the web structure. Fibers falling into this category include metal, metalized inorganic, metalized synthetic, glass, graphite, carbon and ceramic fibers and fibers such as the aramid fibers sold under the trade names Kevlar and Nomex, and generally includes any fiber having a tensile modulus higher than about 10,000 Mega Pascals at room temperature and pressure.

Particulate plastic materials include short plastics fibers which can be included to enhance the cohesion of the web structure during manufacture. Bonding is effected by utilizing the thermal characteristics of the plastic materials within the web structure. The web structure is heated sufficiently to cause the thermoplastic component to fuse at its surfaces to adjacent particles and fibers.

In one embodiment, individual reinforcing fibers should not on he average be shorter than about 7 millimeters, because shorter fibers do not generally provide adequate reinforcement in the ultimate molded article. Also, fibers should not on average be longer than about 200 millimeters since such fibers are difficult to handle in the manufacturing process.

In one embodiment, glass fibers are used, and in order to confer structural strength the fibers have an average diameter between about 7 and about 22 microns. Fibers of diameter less than about 7 microns can easily become airborne and can cause environmental health and safety issues. Fibers of diameter greater than about 22 microns are difficult to handle in manufacturing processes and do not efficiently reinforce the plastics matrix after molding.

In one embodiment, the thermoplastics material is, at least in part, in a particulate form. Suitable thermoplastics include, but are not limited to, polyethylene, polypropylene, polystyrene, acrylonitrylstyrene, butadiene, polyethyleneterephthalate, polybutyleneterephthalate, polybutyleneterachlorate, and polyvinyl chloride, both plasticised and unplasticised, and blends of these materials with each other or other polymeric materials. Other suitable thermoplastics include, but are not limited to, polyarylene ethers, polycarbonates, polyestercarbonates, thermoplastic polyesters, polyetherimides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. Preferably, the thermoplastic material has a limited oxygen index (LOI) greater than about 22, as measured in accordance with ISO 4589-2, second edition, Mar. 15, 1996, test method. It is anticipated that any thermoplastics resin can be used which is not chemically attacked by water and which can be sufficiently softened by heat to permit fusing and/or molding without being chemically or thermally decomposed.

In one embodiment, the plastic particles need not be excessively fine, but particles coarser than about 1.5 millimeters are unsatisfactory in that they do not flow sufficiently during the molding process to produce a homogenous structure. The use of larger particles can result in a reduction in the flexural modulus of the material when consolidated. In one embodiment, the plastics particles are not more than about 1 millimeter in size.

Core layer 12 further includes an effective amount of at least one flame retardant agent containing at least one of N, P, As, Sb, Bi, S, Se, Te, Po, F, Cl, Br, I, and At. In one exemplary embodiment, the flame retardant agent is a halogen flame retardant agent. In another embodiment, the flame retardant agent is a halogenated thermoplastic polymer, for example, tetra-bromo bisphenol-A. The amount of the flame retardant in core layer 12 can range in one embodiment from about 2 weight percent to about 13 weight percent, in another embodiment from about 2 weight percent to about 5 weight percent, and in another embodiment, from about 5 weight percent to about 13 weight percent.

Core layer 12 can also include one or more smoke suppressant compositions in the amount of about 0.2 weight percent to about 10 weight percent. Suitable smoke suppressant compositions include, but are not limited to, stannates, zinc borates, zinc molybdate, magnesium silicates, calcium zinc molybdate, calcium silicates, calcium hydroxides, and mixtures thereof.

Core layer 12 can also include a synergist material to increase the efficacy of the halogen flame retardants. Suitable synergist materials include, but are not limited to, sodium trichlorobenzene sulfonate potassium, diphenyl sulfone-3-sulfonate, and mixtures thereof.

Referring to FIG. 1, skins 14 and 16 are formed from materials that can withstand processing temperatures of between about 200° C. and about 425° C. Skins 14 and 16 can be thermoplastic films, elastomeric films, metal foils, thermosetting coating, inorganic coatings, fiber reinforced scrims, and woven or non-woven fabric materials. Any suitable thermoplastic material, including blends of thermoplastic materials, having a LOI greater than about 22, as measured in accordance with ISO 4589-2, second edition, Mar. 15, 1996, test method, can be used for forming the thermoplastic films, for example, poly(ether imide), poly(ether ketone), poly(ether-ether ketone), poly(phenylene sulfide), poly(ether sulfone), poly(amide-imide), poly(aryl sulfone) and combinations thereof. Suitable fibers for forming the scrims include, but are not limited to, glass fibers, aramid fibers, carbon fibers, inorganic fibers, metal fibers, metalized synthetic fibers, metalized inorganic fibers, and combinations thereof. Preferably, the fibers used in forming the scrims have a LOI greater than about 22, as measured in accordance with ISO 4589-2, second edition, Mar. 15, 1996, test method.

In one embodiment, the inorganic coating includes a layer of at least one of gypsum paste, a calcium carbonate paste, a mortar and a concrete. The fiber-based scrim includes a lightweight non-woven covering material manufactured via wet laid, air laid, spunbond, and spunlace processes. The fiber based scrim includes, for example, glass, carbon, polyacrylonitrile, aramid, poly(p-phenylene-benzobisoxazole), poly (ether-imide), poly(phenylene sulfide), etc. The non-woven fabric includes a thermoplastic material, a thermal setting binder, inorganic fibers, metal fibers, metallized inorganic fibers and metallized synthetic fibers.

Skins 14 and 16 are laminated to core layer 12 by any suitable lamination process using heat and/or pressure with or without the use of an adhesive or a tie layer, for example using nip rollers or a lamination machine. Skins 14 and 16 are laminated to core 12 after it has been formed, and in one embodiment, skins 14 and 16 are laminated to core layer 12 before it has been cut into sheets of predetermined size. In another embodiment, skins 14 and 16 are laminated to core layer 12 after it has been cut into sheets. In one embodiment, the temperature of the lamination process is greater than the glass transition temperature of the thermoplastic resins of the skins and core layer, for example, greater than about 100° C. In another embodiment, skins 14 and 16 are bonded to core layer 12 at room temperature using thermal setting adhesives and pressure.

Figure 2:
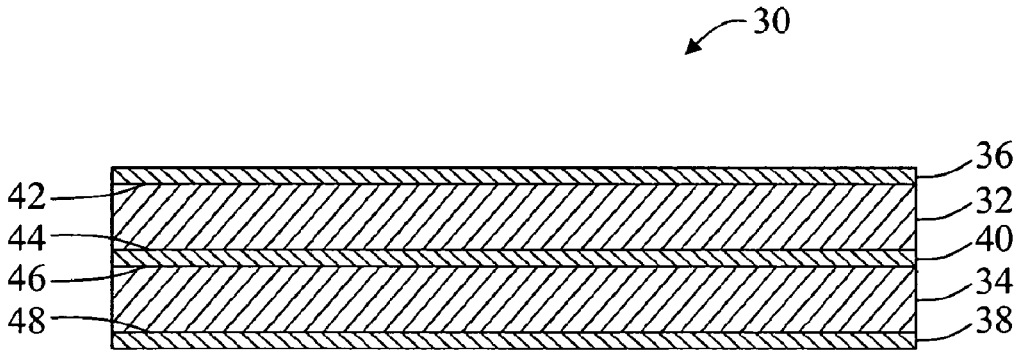
FIG. 2 is cross sectional illustration of an exemplary fiber reinforced thermoplastic sheet in accordance with another embodiment of the present invention.

FIG. 2 is a cross sectional illustration of another exemplary fiber reinforced thermoplastic sheet 30 that includes core layers 32 and 34, and skins 36, 38 and 40 laminated to core layers 32 and 34. Particularly, core layer 32 includes a first surface 42 and a second surface 44, and core layer 34 includes a first surface 46 and a second surface 48. Core layers 32 and 34 are arranged so that second surface 44 of core layer 32 is adjacent to first surface 46 of core layer 34. Skin 36 is positioned over first surface 42 of core layer 32, skin 38 is positioned over second surface 48 of core layer 34, and skin 40 is positioned between second surface 44 of core layer 32 and first surface 46 of core layer 34. Core layers 32 and 34, and skins 36, 38, and 40 are laminated together to form fiber reinforced thermoplastic sheet 30.

Core layers 32 and 34, similar to core layer 12 described above, includes about 20% to about 80% by weight fibers having a high tensile modulus of elasticity and about 20% to about 80% by weight of thermoplastics material. The thermoplastic material and/or the fibers of core layer 32 can be the same or different from the thermoplastic material and/or the fibers of core layer 34 depending on the desired properties of sheet 30.

Skins 36, 38, and 40, similar to skins 14 and 16 described above, are formed from materials that can withstand processing temperatures of between about 200° C. and about 425° C. Skins 36, 38, and 40 can be thermoplastic films, fiber reinforced scrims, and woven or non-woven fabric materials. Skins 36, 38, and 40 can be formed from the same materials or can be formed from different materials depending on the desired properties of sheet 30.

Figure 3:
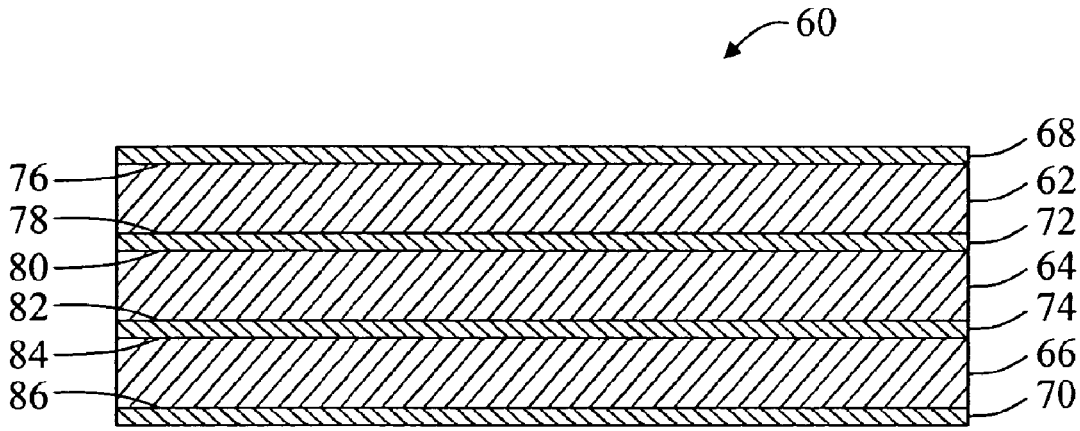
FIG. 3 is cross sectional illustration of an exemplary fiber reinforced thermoplastic sheet in accordance with another embodiment of the present invention.

In an alternate embodiment, sheet 30 does not include skin 40 laminated between core layers 32 and 34. In further alternate embodiments, only one of the outer surfaces of sheet 30 includes a skin and/or a skin laminated between core layers 32 and 34. In a further alternate embodiment, sheet 30 includes a skin or a skin 40 laminated between core layers 32 and 34 that covers at least a part of second surface 44 of core layer 32 and first surface 46 of core layer 34. FIG. 3 is a cross sectional illustration of another exemplary fiber reinforced thermoplastic sheet 60 that includes porous core layers 62, 64, and 66, and skins 68, 70, 72, and 74 laminated to core layers 62, 64, and 66. Particularly, core layer 62 includes a first surface 76 and a second surface 78, core layer 64 includes a first surface 80 and a second surface 82, and core layer 66 includes a first surface 84 and a second surface 86. Core layers 62, 64, and 66 are arranged so that second surface 78 of core layer 62 is adjacent to first surface 80 of core layer 64, and second surface 82 of core layer 64 is adjacent to first surface 84 of core layer 66. Skin 68 is positioned over first surface 76 of core layer 62, skin 70 is positioned over second surface 86 of core layer 66, skin 72 is positioned between second surface 78 of core layer 62 and first surface 80 of core layer 64, and skin 74 is positioned between second surface 82 of core layer 64 and first surface 84 of core layer 66. Core layers 62, 64, and 66, and skins 68, 70, 72, and 74 are laminated together to form fiber reinforced thermoplastic sheet 60.

Core layers 62, 64, and 66, similar to core layer 12 described above, includes about 20% to about 80% by weight fibers having a high modulus of elasticity and about 20% to about 80% by weight of one or more thermoplastic materials. The thermoplastic material and/or the fibers of each core layer 62, 64, and 66 can be the same or different from the thermoplastic material and/or the fibers of each other core layer depending on the desired properties of sheet 60.

Skins 68, 70, 72, and 74, similar to skins 14 and 16 described above, are formed from materials that can withstand processing temperatures of between about 200° C. and about 425° C. Skins 68, 70, 72, and 74 can be thermoplastic films, fiber reinforced scrims, and woven or non-woven fabric materials. Skins 68, 70, 72, and 74 can be formed from the same materials or can be formed from different materials depending on the desired properties of sheet 60. In an alternate embodiments, sheet 60 includes one or more of skins 68, 70, 72, and 74 but not all four skins. In another embodiment, sheet 60 includes one or more of skins 68, 70, 72, and 74 covering at least a part of the surfaces of core layers 62, 64, and 66.

The porous fiber-reinforced thermoplastic composite sheets described above can be used in, but not limited to, building infrastructure, aircraft, train and naval vessel side wall panels, ceiling panels, cargo liners, office partitions, elevator shaft lining, ceiling tiles, recessed housing for light fixtures and other such applications that are currently made with honeycomb sandwich structures, thermoplastic sheets, and FRP. The composite sheets can be molded into various articles using methods known in the art including, for example, pressure forming, thermal forming, thermal stamping, vacuum forming, compression forming, and autoclaving. The combination of high stiffness to weight ratio, ability to be thermoformed with deep draw sections, end of life recyclability, acoustics and desirable low flame spread index, heat release, smoke density and gas emission properties make the porous fiber-reinforced thermoplastic composite a more desirable product than the products currently being used.

The invention will be further described by reference to the following examples which are presented for the purpose of illustration only and are not intended to limit the scope of the invention. Unless otherwise indicated, all amounts are listed as parts by weight.

Comparative example tests comparing the flame, smoke and gaseous emissions of a control sample designated Sample A and exemplary samples of an embodiment of the invention designated Samples B and C. Sample A is a porous fiber-reinforced sheet formed from a blend of poly(ether-imide), commercially available from General Electric Company under the ULTEM trademark, and bisphenol A polycarbonate resin containing a bromine based fire retardant additive, commercially available from General Electric Company under the LEXAN trademark, the resins blended in weight ratios of 5 percent and 55 percent. The blended resins were dispersed in a porous fiber-reinforced sheet containing about 40 weight percent glass fibers having a nominal fiber diameter of 16 microns and an average length of 12.7 mm. Sample B is the porous fiber-reinforced sheet of Sample A laminated with 76 micron thick poly(ether-imide) films, commercially available from General Electric Company under the ULTEM trademark, in accordance with an embodiment of the present invention. Sample C is the porous fiber-reinforced sheet of Sample A laminated with 27 g/m$^2$ aramid scrims, commercially available from E.I. du Pont de Nemours and Company under the KEVLAR trademark laminated onto the exterior surfaces in accordance with an embodiment of the present invention. Sample D is the porous fiber-reinforced sheet of Sample A laminated with 8 mil thick polypropylene films. Sample D is a comparative sample that contains laminated polypropylene films that have an LOI of 17. The results are presented below in Tables I to II.

Comparative example tests comparing the flame and smoke characteristics of Sample E, a porous fiber-reinforced sheet formed from a blend of poly(ether-imide) and polycarbonate resins in weight ratio of 25 percent each with 50 weight percent glass fibers of 16 micron in diameter and 12.7 mm in length, Sample F, a porous fiber-reinforced sheet formed from a blend of poly(ether-imide) and an eco-friendly flame retardant based polycarbonate resin in a weight ratios of 5 and 55 percent combined with 40 weight percent glass fibers of 16 microns diameter and 12.7 mm length, Sample G, a porous fiber-reinforced sheet formed from a polycarbonate resin with 50 weight percent glass fibers of 16 micron diameter and 12.7 mm length, Sample H, a porous fiber-reinforced sheet formed from polypropylene with 55 weight percent glass fibers of 16 micron diameter and 12.7 mm length, Sample I, a porous fiber-reinforced sheet formed from a polyarylene ether resin with 50 weight percent glass fibers, and Sample J, a porous fiber-reinforced sheet formed from blend of polycarbonate and polybutylene terephthalate combined in a weight ratio of 33 percent and 17 percent each with 50 weight percent glass fibers of 16 micron diameter and 12.7 mm length are presented below in Table IV.

The fiber-reinforced thermoplastic sheets for Samples A-J were made using the wet-laid paper making process described in United Kingdom Patent Nos. 1129757 and 1329409. The fiber-reinforced thermoplastic sheet was further subjected to heat and pressure in a double belt laminator at 325° C. and 2 bar to partially consolidate the sheet and have the resin wet the fibers. Sample B was prepared from the same fiber-reinforced thermoplastic sheet as Sample A, but with a 75 micrometer thick poly(ether-imide) film covering the surfaces using the double belt laminator under the conditions described above. Sample C was prepared from the same fiber-reinforced thermoplastic sheet as Sample A, but with a 27 g/m$^2$ aramid scrim covering the surfaces using the double belt laminator under the conditions described above. Sample D was prepared from the same fiber-reinforced thermoplastic sheet as Sample A, but with a 8 mil thick polypropylene film covering the surfaces using the double belt laminator under the conditions described above.

The flame characteristics were measured using a radiant heat source and an inclined specimen of the sample material in accordance with ASTM method E-162-02A titled Standard Method for Surface Flammability of Materials Using a Radiant Heat Energy Source. A flame spread index was derived from the rate of progress of the flame front and the rate of heat liberation by the material under test. Key criteria are a flame spread index (FSI) and dripping/burning dripping observations. United States and Canadian requirements for passenger bus applications for interior materials are a FSI of 35 or less with no flaming drips. The Underwriters Laboratory (UL) requires that parts greater than 10 square feet should have an FSI of 200 or less to obtain a listing from UL.

The smoke characteristics were measured by exposing test specimens to flaming and non flaming conditions within a closed chamber according to ASTM method E-662-03 titled Standard Test Method for Specific Optical Density of Smoke Generated by Solid Materials. Light transmissions measurements were made and used to calculate specific optical density of the smoke generated during the test time period. Key criteria are an optical density ($D_s$) of smoke produced by a sample exposed to a radiant furnace or a radiant furnace plus multiple flames. The optical density is plotted versus time for generally 20 minutes. Maximum optical density and time to reach this maximum are important outputs. United States and Canadian Rail regulations and some United States and Canadian Bus guidelines set a maximum $D_s$ of 100 or less at 1.5 minutes, and a maximum $D_s$ of 200 or less at 4 minutes. Global Air regulations sets the $D_s$ at 4 minutes for many large interior applications at 200 or less.

FAA requirements for toxicity and flame were also measured in accordance FAA tests BSS-7239, developed by Boeing Corporation, and FAR 25.853 (a) Appendix F, Part IV (OSU 65/65) Calorimeter.

A large part in an aircraft passenger cabin interior typically will need to meet the ASTM E162 and ASTM E662 described above as well a maximum $D_s$ of 200 at 4 minutes. A difficult test for plastics has traditionally been the OSU 65/65 heat release test. In this test, the test material is exposed to defined radiant heat source, and calorimeter measurements are recorded. Key criteria are an average maximum heat release during the 5 minute test that should not exceed 65 kW/m$^2$, and an average total heat released during the first 2 minutes of the test that should not exceed 65 kW-min/m$^2$.

In the 60 second vertical burn test, the part is exposed to a small-scale open flame for 60 seconds and the key criteria are a burned length of 150 mm or less, an after flame time of 15 seconds or less, and flame time drippings of 3 seconds or less.

TABLE I

| Test Method | Sample A | Sample B | Sample C | Sample D |
|---|---|---|---|---|
| ASTM E-162: | | | | |
| Average Flame Spread Index $F_s$ | 10 | 5.5 | 6.0 | >200 |
| Flaming Drips | None | None | None | Yes |
| ASTM E-662: | | | | |
| Smoke Density $D_s$ at 1.5 minutes | 9 | 2 | 6 | 6 |
| Smoke Density $D_s$ at 4.0 minutes | 65 | 25 | 133 | 133 |
| Maximum Smoke Density $D_{sMax}$ | 315 | 182 | 289 | 289 |
| FAR 25.853 (a) Appendix F, Part IV: | | | | N/A |
| 2 minutes Total Heat Release | 54 kW/m$^2$ | 45 kW/m$^2$ | 48 kW/m$^2$ | |
| Maximum Heat Release | 54 KW/m$^2$ | 41 KW/m$^2$ | 48 KW/m$^2$ | |

TABLE I-continued

| Test Method | Sample A | Sample B | Sample C | Sample D |
|---|---|---|---|---|
| 60 Second Vertical Burn: | | | | |
| Vertical Burn Time | Pass | Pass | Pass | |
| Burn Length | 91.4 mm | 61.0 mm | 53.3 mm | |

TABLE II

| BSS-7239: Gases | Sample A (ppm at 4 minutes) | Sample B (ppm at 4 minutes) |
|---|---|---|
| HCN | 1 | 1 |
| CO | 200 | 100 |
| $NO + NO_3$ | 2 | 2 |
| $SO_2$ | <1 | <1 |
| HF | <1 | <1 |
| HCL | 2 | 1 |

TABLE III

| Test Method | Sample E | Sample F | Sample G | Sample H | Sample I | Sample J |
|---|---|---|---|---|---|---|
| ASTM E-162: | | | | | | |
| $F_s$ | 27.5 | 50 | 45 | 245 | 39 | 69 |
| Flaming Drips | None | None | None | F.D.* | None | None |
| ASTM E-662: | | N/A | | | | |
| $D_s$ at 1.5 minutes | 13 | | 18 | 21 | 28 | 16 |
| $D_s$ at 4.0 minutes | 114 | | 100 | 146 | 53 | 79 |
| Max. $D_{sMax}$ | 299 | | 388 | 495 | 59 | 294 |

*F.D. = flaming drips.

The above test results show that the fiber reinforced thermoplastic sheet with poly(ether imide) skins of Sample B and with aramid scrims of Sample C exhibit a reduced flame spread index $F_s$, a reduced smoke density $D_s$, reduced heat release, and reduced gaseous emissions over Sample A. As shown in Table 1, Samples B and C exhibit test results that are superior to the test results of Sample A. For example, Samples B and C exhibited a lower flame spread index $F_s$, 5.5 and 6.0 respectively, than Sample A, which had a $F_s$ of 10. Particularly, Samples B and C exhibited lower test results for the tests run according to ASTM E-162, ASTM E-662, FAR 25.853 (a), and the 60 second vertical burn test. The only anomaly being the 4 minute smoke density D, result of Sample C. Comparative Example D, which included a thermoplastic film having an LOI of only 17, exhibited a flame spread index $F_s$ of greater than 200 and exhibited flaming drips. Further, each of samples E-J exhibit at least one of a flame spread index $F_s$ and a four minute smoke density $D_s$ that are significantly higher than the flame spread index $F_s$ and the four minute smoke density $D_s$ of Samples B and C.

Further comparative example tests comparing the flame, smoke and gaseous emissions of a control sample designated Sample K and exemplary samples of an embodiment of the invention designated Samples L and M. Sample L is similar to Sample A described above. Sample K is similar to Sample G described above and is a porous fiber-reinforced sheet formed from a blend of poly(ether-imide), commercially available from General Electric Company under the ULTEM trademark, and bisphenol A polycarbonate resin free of fire retardant additives, commercially available from General Electric Company under the LEXAN trademark.

Further comparative example tests comparing the flame, smoke and gaseous emissions of a control sample designated Sample K and exemplary samples of an embodiment of the invention designated Samples L and M were made using nominal 16 micron, 12.7 mm long wet chopped glass fibers and a blended mixture of powdered polyetherimide resin, a relatively high flow Bisphenol-A Polycarbonate (BPA-PC) resin with a nominal MFI≥25 g/10 min @300° C./12.kgf, and a random copolymer polycarbonate resin containing Bisphenol-A and Tetra-bromo Bisphenol A (TBBPA) units in the polymer backbone with a nominal 26% Bromine content and MFI≥7 g/10 min @300° C./12.kgf. The powder blending of the polycarbonate resins at different blend ratios allowed for tuning the total bromine content of the resins used in the core web. The core web had an area weight of around 2000±100 grams/$m^2$ and a w/w glass content of around 45%±5%. Sample K was made without the bromine containing resin. The fiber-reinforced thermoplastic sheets for Samples K-M were made using the wet-laid paper making process described in United Kingdom Patent Nos. 1129757 and 1329409. The fiber-reinforced thermoplastic sheets were further subjected to heat and pressure in a double belt laminator at 325° C. and 2 bar to partially consolidate the sheet and have the resin wet the fibers.

TABLE IV

| Test Method | Sample K | Sample L | Sample M |
|---|---|---|---|
| Bromine Content in weight % | 0 | 8.1 | 9.0 |
| ASTM E-162: | | | |
| Average Flame Spread Index $F_s$ | 45 | 10 | 6 |
| Flaming Drips | None | None | None |
| ASTM E-662: | | | |
| Smoke Density $D_s$ at 1.5 minutes | 18 | 9 | 4 |
| Smoke Density $D_s$ at 4.0 minutes | 100 | 165 | 114 |
| Maximum Smoke Density $D_{sMax}$ | 388 | 315 | 272 |

The test results of Samples K-M show that the addition of bromine in Samples L and M reduces the flame spread index F, in comparison to control Sample M. Also shown, is that the addition of bromine in Samples Land M reduces the maximum smoke density D, in comparison to control Sample M.

When introducing elements of the methods and articles described and/or illustrated herein, including any and all embodiment(s) thereof, the articles "a", "an", "the" and "said" are intended to mean that there are one or more of the elements. The terms "comprising", "including" and "having" are intended to be inclusive and mean that there may be additional elements other than the listed elements.

While the invention has been described in terms of various specific embodiments, those skilled in the art will recognize that the invention can be practiced with modification within the spirit and scope of the claims.

What is claimed is:

1. A composite sheet material comprising a porous core layer, said core layer comprising:

a web of open celled structures defined by random crossing over of reinforcing fibers held together by a thermoplastic polymer;

said web comprising about 20 weight percent to about 80 weight percent of reinforcing fibers based on a total weight of said porous core layer, and an effective amount of a flame retardant agent, said flame retardant agent comprising at least one of [N, P, As, Sb, Bi, S, Se, Te, Po,] F, Cl, Br, I, and At.

2. A composite sheet material in accordance with claim 1 wherein said flame retardant agent comprises a halogenated thermoplastic polymer.

3. A composite sheet material in accordance with claim 2 wherein said halogenated thermoplastic polymer comprises tetrabromo bisphenol-A polycarbonate.

4. A composite sheet material in accordance with claim 2 wherein said core layer comprises about 2.0 weight percent to about 13.0 weight percent bromine.

5. A composite sheet material in accordance with claim 2 wherein said core layer comprises about 2.0 weight percent to about 5.0 weight percent bromine.

6. A composite sheet material in accordance with claim 1 further comprising a smoke suppressant composition, said smoke suppressant composition comprising at least one of stannates, zinc borates, zinc molybdate, magnesium silicates, calcium zinc molybdate, calcium silicates and calcium hydroxides.

7. A composite sheet material in accordance with claim 1 further comprising at least one of sodium trichlorobenzene sulfonate potassium and diphenyl sulfone-3-sulfonate.

8. A composite sheet material in accordance with claim 1 further comprising at least one skin, each said skin covering at least a portion of a surface of said porous core layer, said skin comprising at least one of a thermoplastic film, an elastomeric film, a metal foil, a thermosetting coating, an inorganic coating, a fiber based scrim, a non-woven fabric, and a woven fabric, said skin having a limiting oxygen index greater than about 22, as measured at a predetermined thickness used to cover at least a portion of a surface of said porous core layer per ISO 4589-2, first edition, 1996.

9. A composite sheet material in accordance with claim 8 wherein said thermoplastic film comprises at least one of poly(ether imide), poly(ether ketone), poly(ether-ether ketone), poly(phenylene sulfide), poly(arylene sulfone), poly (ether sulfone), [poly(antde-imide)] *poly(amide-imide)*, poly (1,4-phenylene), polycarbonate, nylon, and silicone.

10. A composite sheet material in accordance with claim 8 wherein said fiber based scrim comprises at least one of glass fibers, aramid fibers, graphite fibers, carbon fibers, inorganic mineral fibers, metal fibers, metalized synthetic fibers, and metalized inorganic fibers.

11. A composite sheet material in accordance with claim 10 wherein said fiber based scrim comprises at least one of polyacrylonitrile, p-aramid, m-aramid, poly(p-phenylene2,6, benzobisoxazole), poly(ether-imide) and poly(phenylene sulfide).

12. A composite material in accordance with claim 8 wherein said thermal setting coating comprises at least one of unsaturated [polyurethartes] *polyurethanes*, vinyl esters, phenolics and epoxies.

13. A composite material in accordance with claim 8 wherein said inorganic coating comprises minerals containing cations selected from Ca, Mg, Ba, Si, Zn, Ti and Al.

14. A composite material in accordance with claim 13 wherein said inorganic coating comprises at least one of gypsum, calcium carbonate and mortar.

15. A composite sheet material in accordance with claim 8 comprising:

a first porous core layer having a first surface and a second surface; and at least one skin covering at least a portion of at least one of said first and second surface.

16. A composite sheet material in accordance with claim 8 comprising:

a first and a second porous core layer, each said core layer comprising a first and a second surface, said second surface of said first core layer positioned adjacent said first surface of said second core layer; and at least one skin covering at least a portion of at least one of said first and second surfaces of said first core layer and said first and second surface of said second core layer.

17. A composite sheet material in accordance with claim 16 wherein said first porous core layer comprises at least one of a different thermoplastic material and a different fiber than said second porous core layer.

18. A composite sheet material in accordance with claim 8 comprising:

a first, a second, and a third porous core layer, each said core layer comprising a first and a second surface, said second surface of said first core layer positioned adjacent said first surface of said second core layer, said second surface of said second core layer positioned adjacent said first surface of said third core layer; and at least one skin covering at least one of said first and second surfaces of said first core layer, said first and second surface of said second core layer, and said first and second surface of said third core layer.

19. A composite sheet material in accordance with claim 18 wherein one of said porous core layers comprises at least one of a different thermoplastic material and a different fiber than at least one of said other layers.

20. A composite sheet material according to claim 1 wherein said thermoplastic polymer comprises at least one of polyethylene, polypropylene, polystyrene, acrylonitryistyrene, butadiene, polyethyleneterephthalate, polybutyleneterephthalate, polybutyleneterachlorate, polyvinyl chloride, polyphenylene ether, polycarbonates, polyestercarbonates, thermoplastic polyesters, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, and silicones.

21. A method of manufacturing a porous fiber-reinforced thermoplastic sheet, said method comprising:

providing a porous fiber-reinforced thermoplastic sheet comprising at least one porous core layer comprising a web of open celled structures defined by random crossing over of reinforcing fibers held together by a thermoplastic material, said web comprising from about 20 weight percent to about 80 weight percent fibers, and an effective amount of a flame retardant agent, said flame retardant agent comprising at least one of [N, P, As, Sb, Bi, S, Se, Te, Po,] F, Cl, Br, I, and At; and laminating at least one skin to a surface of the porous fiber-reinforced thermoplastic sheet, each skin comprising at least one of a thermoplastic film, an elastomeric film, a metal foil, a thermosetting coating, an inorganic coating, a fiber based scrim, a non-woven fabric, and a woven fabric, the skin having a limiting oxygen index greater than about 22, as measured per ISO 4589-2, first edition, 1996, to enhance at least one of the flame, smoke, heat release and gaseous emissions characteristics of the porous fiber-reinforced thermoplastic sheet.

22. A method in accordance with claim 21 wherein the flame retardant agent comprises a halogenated thermoplastic polymer.

23. A method in accordance with claim 22 wherein the halogenated thermoplastic polymer comprises tetrabromo bisphenol-A polycarbonate.

24. A method in accordance with claim 21 wherein the core layer comprises about 2.0 weight percent to about 13.0 weight percent bromine.

25. A method in accordance with claim 21 wherein the core layer further comprises a smoke suppressant composition, said smoke suppressant composition comprising at least one of stannates, zinc borates, zinc molybdate, magnesium silicates, calcium zinc molybdate, calcium silicates and calcium hydroxides.

26. A method in accordance with claim 21 wherein the core layer further comprises at least one of sodium trichlorobenzene sulfonate potassium and diphenyl sulfone-3-sulfonate.

*27. The composite sheet material of claim 1, in which the at least one thermoplastic polymer has a limiting oxygen index greater than about 22, as measured per ISO 4589-2, first edition, 1996.*

*28. The composite sheet material of claim 1, in which the at least one thermoplastic polymer is a polyetherimide polymer.*

*29. The composite sheet material of claim 1, in which the at least one thermoplastic polymer is a polycarbonate polymer.*

*30. The composite sheet material of claim 1, further comprising at least one skin disposed on at least a portion of said porous core layer.*

*31. The composite sheet material of claim 30, in which said skin comprises glass fibers.*

*32. A composite sheet material comprising a porous core layer, said porous core layer comprising a web of open celled structures defined by random crossing over of reinforcing fibers held together by a thermoplastic polymer blend, said thermoplastic polymer blend comprising at least two resins at least one of which comprises an effective amount of a flame retardant agent.*

*33. The composite sheet material of claim 32, in which the thermoplastic polymer blend has a limiting oxygen index greater than about 22, as measured per ISO 4589-2, first edition, 1996.*

*34. The composite sheet material of claim 32, in which the thermoplastic polymer blend comprises a polyetherimide polymer.*

*35. The composite sheet material of claim 32, in which the thermoplastic polymer blend comprises a polycarbonate polymer.*

*36. The composite sheet material of claim 32, further comprising at least one skin disposed on at least a portion of the porous core layer.*

*37. The composite sheet material of claim 36, in which said skin comprises glass fibers.*

*38. The composite sheet material of claim 32, further comprising a first skin disposed on at least a portion of a first surface of the porous core layer, and a second skin disposed on at least a portion of a second surface of the porous core layer opposite the first surface of the porous core layer.*

*39. The composite sheet material of claim 32, in which said web comprises about 20 weight percent to about 80 weight percent of reinforcing fibers based on a total weight of said porous core layer.*

*40. The composite sheet material of claim 32, in which the thermoplastic polymer blend comprises a halogenated thermoplastic polymer.*

*41. The composite sheet material of claim 40, in which the halogenated thermoplastic polymer is a polycarbonate polymer comprising bromine.*

*42. The composite sheet material of claim 32, in which the thermoplastic polymer blend comprises two polymers comprising the same polymer backbone.*

*43. The composite sheet material of claim 42, in which the two polymers comprising the same polymer backbone are polycarbonate polymers.*

* * * * *